United States Patent
Okada et al.

(10) Patent No.: US 11,437,930 B2
(45) Date of Patent: Sep. 6, 2022

(54) INVERTER CONTROL DEVICE

(71) Applicant: Mitsubishi Electric Corporation, Tokyo (JP)

(72) Inventors: Shigeya Okada, Tokyo (JP); Mitsuo Kashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 17 days.

(21) Appl. No.: 17/269,673

(22) PCT Filed: Sep. 21, 2018

(86) PCT No.: PCT/JP2018/034988
§ 371 (c)(1),
(2) Date: Feb. 19, 2021

(87) PCT Pub. No.: WO2020/059108
PCT Pub. Date: Mar. 26, 2020

(65) Prior Publication Data
US 2021/0242800 A1  Aug. 5, 2021

(51) Int. Cl.
*H02M 7/5387* (2007.01)
*B62D 5/04* (2006.01)
*H02M 7/5395* (2006.01)

(52) U.S. Cl.
CPC ........ *H02M 7/53875* (2013.01); *B62D 5/046* (2013.01); *H02M 7/5395* (2013.01)

(58) Field of Classification Search
CPC ............. H02M 7/539; H02M 7/53875; H02M 7/5395; H02M 7/5387; B62D 5/046
See application file for complete search history.

(56) References Cited

U.S. PATENT DOCUMENTS 9,444,369 B2   9/2016  Suzuki
10,680,544 B2 *  6/2020  Kishita ................... H02M 7/48
(Continued)

FOREIGN PATENT DOCUMENTS

JP     2008-131770 A    6/2008
JP     2015-061381 A    3/2015
(Continued)

OTHER PUBLICATIONS

International Search Report of the International Searching Authority dated Oct. 30, 2018 for the corresponding international application No. PCT/JP2018/034988(and English translation).

*Primary Examiner* — Adolf D Berhane
(74) *Attorney, Agent, or Firm* — Posz Law Group, PLC

(57) ABSTRACT

It provides an inverter main circuit converting a DC-voltage into three-phase AC-voltages, a DC-current detection unit detecting the DC-current value of a DC-current flowing in the main circuit, and an inverter control unit generating a drive signal for controlling operation of the main circuit using a voltage command value corresponding to each phase of the three-phase AC-voltages and a triangular-wave carrier. Using a time period during which the triangular-wave carrier monotonically increases or decreases as a unit period, the control unit provides control to alternately use, as the DC-current value for use in computation of the voltage command value, the DC-current value detected in the unit period in which the triangular-wave carrier monotonically increases and the DC-current value detected in the unit period in which the triangular-wave carrier monotonically decreases, for every voltage command value control period set to three times or more and an integer multiple of the unit period.

8 Claims, 6 Drawing Sheets

(56) References Cited

U.S. PATENT DOCUMENTS 10,696,141 B2 * 6/2020 Kashima .................. H02P 21/00
11,070,157 B2 * 7/2021 Kashima ................... H02P 1/32

FOREIGN PATENT DOCUMENTS

JP  2015-142444 A  8/2015
WO 2017/130447 A1 8/2017

* cited by examiner

INVERTER CONTROL DEVICE

CROSS REFERENCE TO RELATED APPLICATION

This application is a U.S. national stage application of International Patent Application No. PCT/JP2018/034988 filed on Sep. 21, 2018, the disclosure of which is incorporated herein by reference.

TECHNICAL FIELD

The present invention relates to an inverter control device including an inverter main circuit that converts a direct current (DC) voltage to a three-phase alternating current (AC) voltage.

BACKGROUND

An inverter control device conventionally includes a control unit that generates a drive signal using the value of a DC current flowing in the inverter main circuit to control the operation of the inverter main circuit. Patent Literature 1 discloses a technique in which a microcomputer functioning as the control unit generates a drive signal using the value of the DC current obtained at a specific timing in each of voltage command change periods, where the voltage command change period is set to be a time period including three or more and an odd number of unit periods, each of the unit periods having a triangular wave carrier signal used for generation of the drive signal, the triangular wave carrier signal monotonically increasing or monotonically decreasing.

PATENT LITERATURE

Patent Literature 1: Japanese Patent Application Laid-open No. 2008-131770

However, the technique described in Patent Literature 1 is subject to a constraint on the voltage command change period in that the number of the constituent unit periods is three or more and an odd number. This presents a problem in that the inverter control device may fail to provide suitable control in view of a combined total efficiency of the efficiency of the inverter main circuit and the efficiency of a motor supplied with a three-phase AC voltage from the inverter main circuit.

SUMMARY

The present invention has been made in view of the foregoing circumstances, and it is an object of the present invention to provide an inverter control device capable of preventing a reduction in a combined total efficiency of the efficiency of the inverter main circuit and the efficiency of the motor supplied with a three-phase AC voltage from the inverter main circuit.

In order to solve the above-mentioned problem and achieve the object, the present invention provides an inverter control device comprising: an inverter main circuit converting a direct-current voltage into three-phase alternating-current voltages; a direct current detection unit detecting a direct current value of an electric direct current flowing in the inverter main circuit; and a control unit generating a drive signal for controlling an operation of the inverter main circuit using a voltage command value corresponding to each phase of the three-phase alternating-current voltages and a triangular wave carrier signal, wherein using a time period during which the triangular wave carrier signal monotonically increases or monotonically decreases as a unit period, the control unit provides control to alternately use, as the direct current value to be used in computation of the voltage command value, the direct current value detected in a unit period in which the triangular wave carrier signal monotonically increases and the direct current value detected in a unit period in which the triangular wave carrier signal monotonically decreases, for every voltage command value control period that is a period for computing the voltage command value, the voltage command value control period being set to three times or more of and an integer multiple of the unit period.

An inverter control device according to the present invention provides an advantageous effect of enabling a combined total efficiency of the efficiency of the inverter main circuit and the efficiency of the motor supplied with a three-phase AC voltage from the inverter main circuit to be prevented from reducing.

DETAILED DESCRIPTION

An inverter control device according to embodiments of the present invention will be described in detail below with reference to the drawings. Note that these embodiments are not intended to necessarily limit the scope of this invention.

First Embodiment

Figure 1:
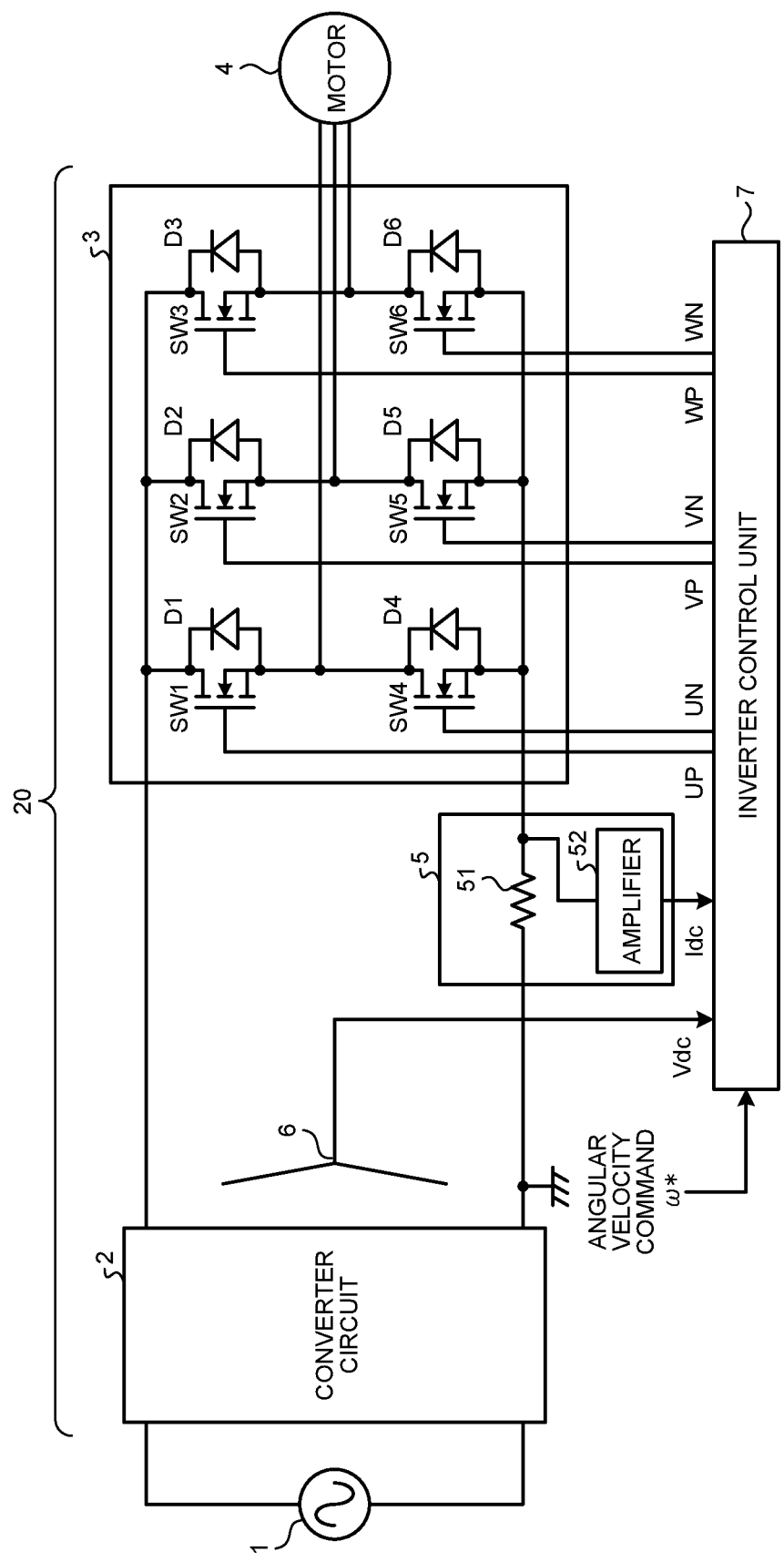
FIG. 1 is a block diagram illustrating an example configuration of an inverter control device according to a first embodiment.

FIG. 1 is a block diagram illustrating an example configuration of an inverter control device 20 according to a first embodiment of the present invention. The inverter control device 20 is connected to an alternating current (AC) power supply 1 and to a motor 4. The inverter control device 20 includes a converter circuit 2, an inverter main circuit 3, a direct current (DC) current detection unit 5, a DC voltage detection unit 6, and an inverter control unit 7.

The converter circuit 2 converts an AC voltage outputted from the AC power supply 1 into a DC voltage. The inverter main circuit 3 includes multiple switching devices SW1 to SW6 and multiple freewheel diodes D1 to D6 connected in parallel with the switching devices SW1 to SW6, respectively. The inverter main circuit 3 causes the switching devices SW1 to SW6 to be turned on and off according to control by the inverter control unit 7 to convert the DC voltage outputted from the converter circuit 2 into a three-phase AC voltage, and supplies the three-phase AC voltage to the motor 4. In the inverter control unit 7, the switching device SW1 and the switching device SW4 are connected to each other at a connection point which is then connected to a U-phase terminal of the motor 4; the switching device SW2 and the switching device SW5 are connected to each other at another connection point which is then connected to a V-phase terminal of the motor 4; and the switching device SW3 and the switching device SW6 are connected to each other at a further connection point which is then connected to a W-phase terminal of the motor 4.

The DC current detection unit 5 detects the value of a DC current that is outputted from the converter circuit 2 and flows into the inverter main circuit 3, i.e., a DC current value Idc. The DC current detection unit 5 includes an amplifier 52 that amplifies the voltage detected by a shunt resistor 51. The DC current detection unit 5 detects the DC current value Idc based on the voltage amplified by the amplifier 52 and the resistance value of the shunt resistor 51. The DC voltage detection unit 6 detects the value of the DC voltage outputted from the converter circuit 2, i.e., a DC voltage value Vdc.

The inverter control unit 7 is a controller that is configured to generate a drive signal for controlling the operation of the inverter main circuit 3 using a voltage command value corresponding to each phase of the three-phase AC voltage and using a triangular wave carrier signal. The inverter control unit 7 generates pulse width modulation (PWM) drive signals UP, UN, VP, VN, WP, and WN for controlling the operations of the switching devices SW1 to SW6 of the inverter main circuit 3, and outputs the PWM drive signals UP, UN, VP, VN, WP, and WN to the switching devices, respectively. The PWM drive signal UP is a drive signal for controlling the operation of the switching device SW1. The PWM drive signal UN is a drive signal for controlling the operation of the switching device SW4. The PWM drive signal VP is a drive signal for controlling the operation of the switching device SW2. The PWM drive signal VN is a drive signal for controlling the operation of the switching device SW5. The PWM drive signal WP is a drive signal for controlling the operation of the switching device SW3. The PWM drive signal WN is a drive signal for controlling the operation of the switching device SW6. The inverter control unit 7 generates voltage command values using an angular velocity command ω* from the outside, the DC current value Idc detected by the DC current detection unit 5, and the DC voltage value Vdc detected by the DC voltage detection unit 6. The inverter control unit 7 generates the PWM drive signals UP, UN, VP, VN, WP, and WN using the voltage command values and a control carrier that is a triangular wave carrier signal. For simplicity of the description, the PWM drive signals UP, UN, VP, VN, WP, and WN may also be hereinafter each referred to simply as PWM drive signal.

Figure 2:
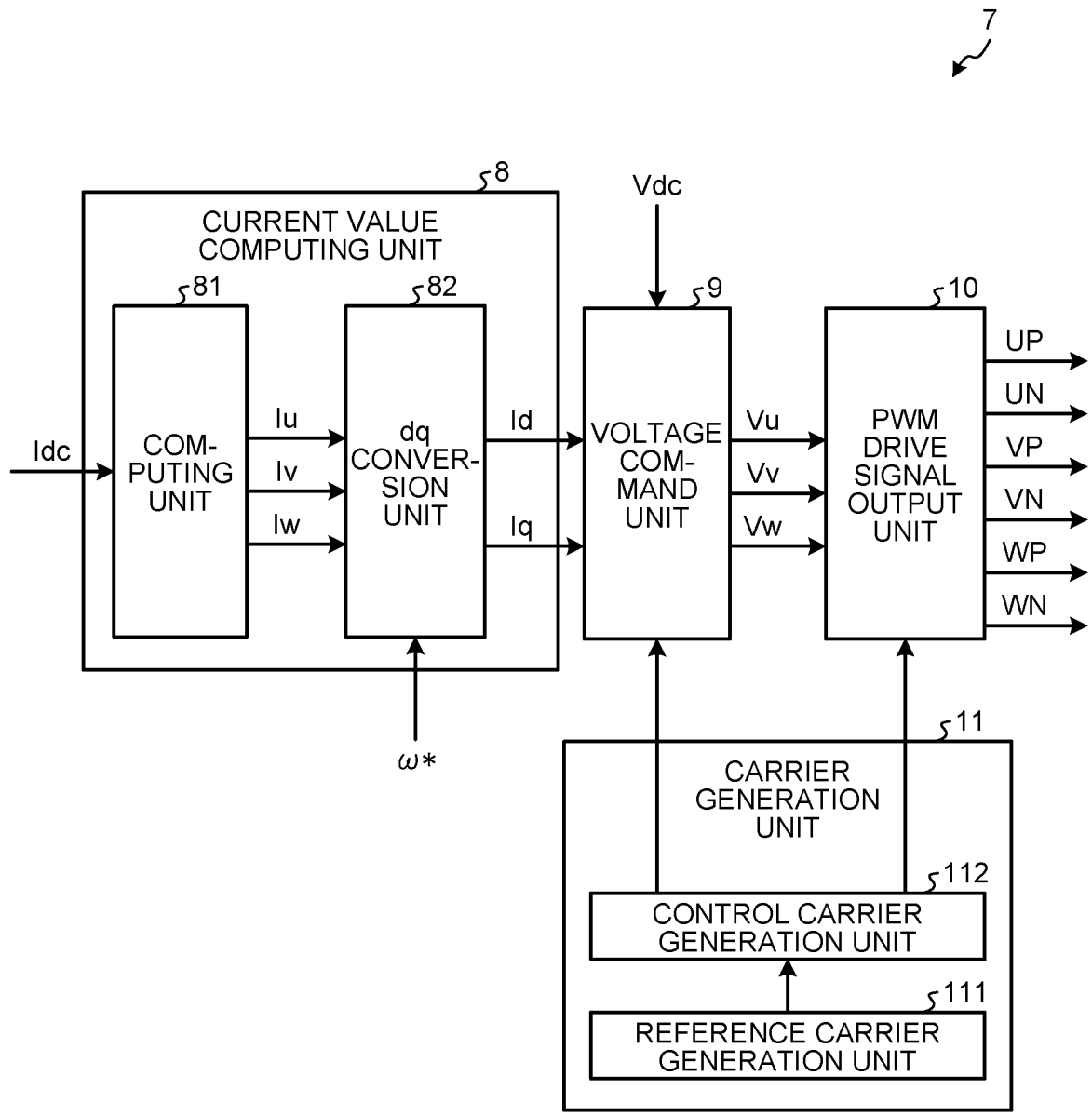
FIG. 2 is a block diagram illustrating an example configuration of the inverter control unit of the inverter control device according to the first embodiment.

FIG. 2 is a block diagram illustrating an example configuration of the inverter control unit 7 of the inverter control device 20 according to the first embodiment. The inverter control unit 7 includes a current value computing unit 8, a voltage command unit 9, a PWM drive signal output unit 10, and a carrier generation unit 11. The current value computing unit 8 includes a computing unit 81 and a dq conversion unit 82. The carrier generation unit 11 includes a reference carrier generation unit 111 and a control carrier generation unit 112.

The computing unit 81 obtains phase current information on at least two phases from the DC current value Idc detected by the DC current detection unit 5, and obtains, through computation thereof, current values Iu, Iv, and Iw as phase current information on three phases. The dq conversion unit 82 converts the current values Iu, Iv, and Iw into current values Id and Iq on orthogonal coordinate axes using the angular velocity command ω*.

The voltage command unit 9 obtains, through computation, voltage command values Vu, Vv, and Vw using the current values Id and Iq acquired from the dq conversion unit 82 and the DC voltage value Vdc acquired from the DC voltage detection unit 6. The voltage command unit 9 outputs the voltage command values Vu, Vv, and Vw obtained through computation to the PWM drive signal output unit 10. The voltage command unit 9 receives a control carrier that is a triangular wave carrier signal, from the carrier generation unit 11. Using the control carrier, the voltage command unit 9 controls a timing of acquiring the current values Id and Iq to be used in computation of the voltage command values Vu, Vv, and Vw. The voltage command unit 9 also controls, using the control carrier, a timing of reflection of the voltage command values Vu, Vv, and Vw obtained through computation, that is, a timing of outputting the voltage command values Vu, Vv, and Vw obtained through computation to the PWM drive signal output unit 10. For simplicity of the description, the voltage command values Vu, Vv, and Vw may also be hereinafter each referred to simply as voltage command value.

Note that the DC current detection unit 5 and the current value computing unit 8 are allowed to stop their functions except at the timing when the voltage command unit 9 acquires the current values Id and Iq from the current value computing unit 8. For example, the voltage command unit 9 starts up the DC current detection unit 5 and the current value computing unit 8, or instructs the DC current detection unit 5 and the current value computing unit 8 to start their operations, at the timing of acquiring the current values Id and Iq from the current value computing unit 8. The DC current detection unit 5 detects the DC current value Idc at the timing when the voltage command unit 9 acquires the current values Id and Iq from the current value computing unit 8. Similarly, the DC voltage detection unit 6 is allowed to stop its function except at the timing when the voltage command unit 9 acquires the DC voltage value Vdc from the DC voltage detection unit 6. For example, the voltage command unit 9 starts up the DC voltage detection unit 6, or instructs the DC voltage detection unit 6 to start its operation, at the timing of acquiring the DC voltage value Vdc from the DC voltage detection unit 6. The DC voltage detection unit 6 detects the DC voltage value Vdc at the timing when the voltage command unit 9 acquires the DC voltage value Vdc.

The PWM drive signal output unit 10 compares the voltage command values acquired from the voltage command unit 9 with the control carrier acquired from the carrier generation unit 11, and generates PWM drive signals based on the comparison results.

The carrier generation unit 11 generates a triangular wave carrier signal from a reference carrier whose one period is equal to a voltage command value control period. The reference carrier generation unit 111 is a signal generator that generates a reference carrier whose one period is equal to the voltage command value control period that is a period during which the voltage command unit 9 computes the voltage command value. The reference carrier generation unit 111 outputs the generated reference carrier to the control carrier generation unit 112. The control carrier generation unit 112 converts the frequency of the reference carrier acquired from the reference carrier generation unit 111 to generate the control carrier that is a triangular wave carrier signal. The control carrier generation unit 112 outputs the generated control carrier to the voltage command unit 9 and the PWM drive signal output unit 10. In this regard, the triangular wave carrier signal is a signal having a period during which a signal level monotonically increases and a period during which a signal level monotonically decreases, these periods appearing alternately. In the triangular wave carrier signal, the monotonically increasing period and the monotonically decreasing period have the same duration of time. The monotonically increasing period and the monotonically decreasing period are herein each defined as a unit period that is a reference unit used for representing the voltage command value control period. In the present embodiment, the control carrier generation unit 112 converts the frequency of the reference carrier to a frequency that is n/2 times thereof to generate and output the control carrier. That is, the control carrier generation unit 112 generates and outputs the control carrier including n unit periods, where n is an integer greater than or equal to three. The voltage command value control period is thus the integral multiple of the unit period, that satisfies three or more times thereof.

Figure 3:
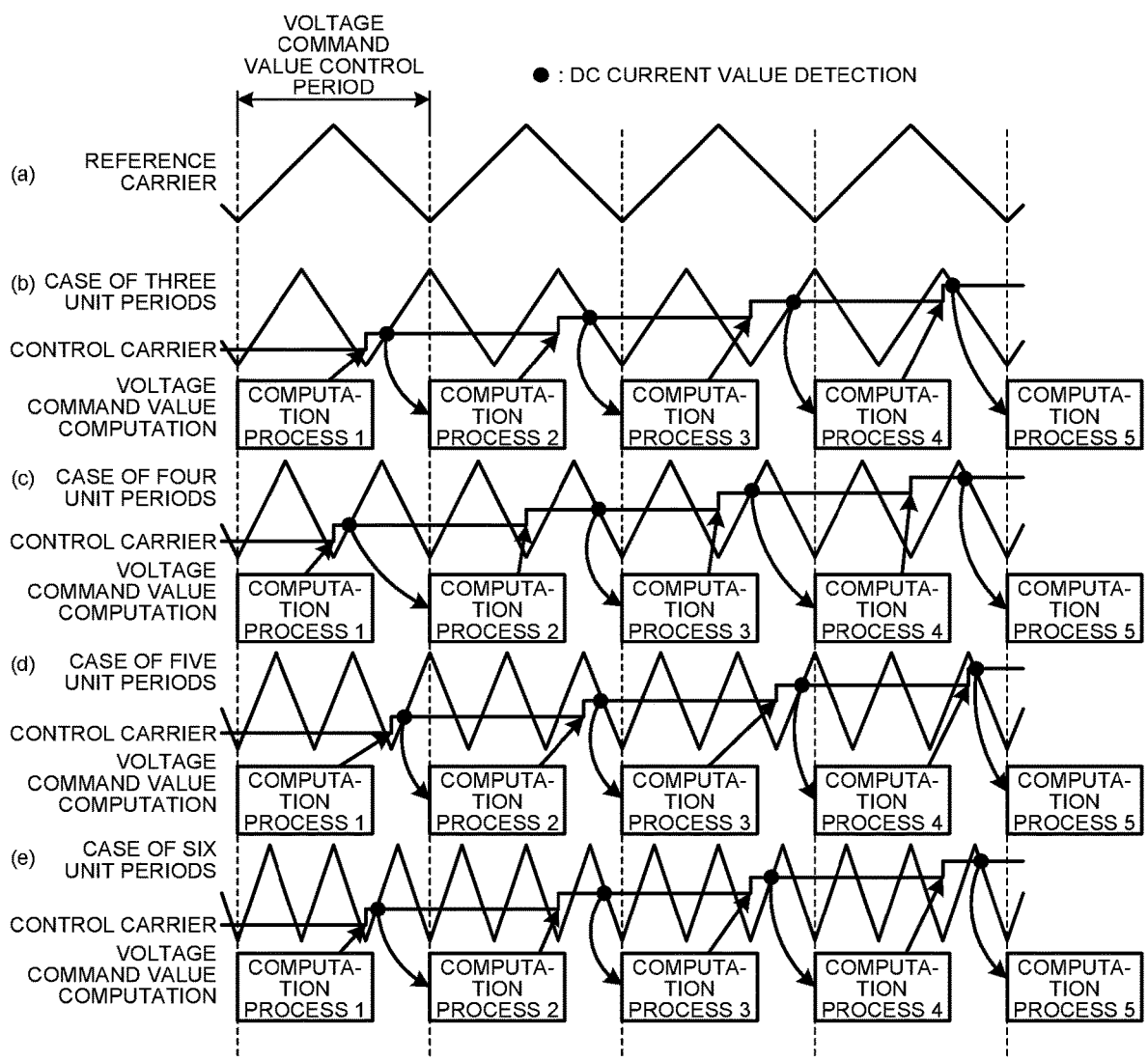
FIG. 3 is a chart illustrating a timing of computation of a voltage command value in the inverter control unit of the inverter control device according to the first embodiment, and a timing of detection of a DC current value to be used in the computation of the voltage command value.

An operation of obtaining, through computation, the voltage command values when the inverter control unit 7 controls the operation of the inverter main circuit 3 in the inverter control device 20 will next be described. FIG. 3 is a chart illustrating a timing of computation of a voltage command value in the inverter control unit 7 of the inverter control device 20 according to the first embodiment, and a timing of detection of the DC current value to be used in the computation of the voltage command value. In FIG. 3, (b) to (e) each illustrate, for simplicity of illustration, one voltage command value of the voltage command values Vu, Vv, and Vw using a stepped line.

The case of (b) of FIG. 3 in which the voltage command value control period is equivalent to three unit periods will first be described. In the inverter control unit 7, the reference carrier generation unit 111 generates the reference carrier illustrated in (a) of FIG. 3, whose one period is equal to the voltage command value control period, and outputs the reference carrier to the control carrier generation unit 112. The control carrier generation unit 112 converts the frequency of the reference carrier to a frequency that is 3/2 times thereof to generate a control carrier having a voltage command value control period including three unit periods. The control carrier generation unit 112 outputs the control carrier to the voltage command unit 9 and to the PWM drive signal output unit 10.

The voltage command unit 9 computes, for every voltage command value control period, the voltage command values using: the current values Id and Iq obtained by conversion of the DC current value Idc detected by the DC current detection unit 5, performed by the current value computing unit 8; and the DC voltage value Vdc detected by the DC voltage detection unit 6. In the first computation operation, the voltage command unit 9 computes the voltage command values using, for example, the current values Id and Iq and the DC voltage value Vdc acquired at the beginning of the voltage command value control period. The voltage command unit 9 reflects the voltage command values obtained through computation to set new voltage command values from in one unit period before the start of the next voltage command value control period. That is, the voltage command unit 9 changes the voltage command values to the voltage command values obtained through the computation from in one unit period before the next voltage command value control period begins. In the second and later computation operations, the voltage command unit 9 computes the voltage command values using the current values Id and Iq and the DC voltage value Vdc acquired during a time period from one unit period before the start of the voltage command value control period until the start of the voltage command value control period.

A timing at which the voltage command unit 9 acquires the current values Id and Iq is a timing when a voltage command value has the same value as the control carrier during a time period from one unit period before the start of the voltage command value control period until the start of the voltage command value control period. The voltage command unit 9 computes the voltage command values for three phases using the current values Id and Iq at the timing when the voltage command value of one of U-phase, V-phase, and W-phase has the same value as the control carrier. The voltage command unit 9 reflects the voltage command values obtained through the computation to set new voltage command values from in one unit period before the start of the next voltage command value control period. The voltage command unit 9 thereafter repeats the process of computing the voltage command values and the process of reflecting the voltage command values. The voltage command unit 9 performs similar processes also in a case where the voltage command value control period corresponds to an odd number times of the unit period, for example, in the case where the voltage command value control period of (d) of FIG. 3 corresponds to five unit periods.

That is, in a case where the voltage command value control period is an odd number times of the unit period, the inverter control unit 7 repeats the process of: reflecting the voltage command values obtained through the computation to set new voltage command values from in one unit period before the start of the next voltage command value control period; and computing the next voltage command values using the DC current value detected during a time period from one unit period before the start of the next voltage command value control period until the start of the next voltage command value control period.

The inverter control unit 7 switches, for every voltage command value control period, the timing to acquire the DC current value Idc to be used in the computation of the voltage command values between a unit period in which the triangular wave carrier signal that is the control carrier monotonically increases and a unit period in which the triangular wave carrier signal that is the control carrier monotonically decreases, alternately. This causes the inverter control unit 7 to encounter the detected DC current values Idc having high and low values alternately relative to the actual DC current value, thereby making it possible to reduce the error in the average value of the DC current value Idc relative to the actual DC current value.

Note that the voltage command unit 9 may hold information on the voltage command value control period by acquiring the reference carrier from the reference carrier generation unit 111, or in a case of a fixed voltage command value control period, the unit 9 may hold such information as information preset by a user or the like.

The case of (c) of FIG. 3 in which the voltage command value control period is equivalent to four unit periods will next be described. In the inverter control unit 7, the reference carrier generation unit 111 generates the reference carrier illustrated in (a) of FIG. 3, whose one period is equal to the voltage command value control period, and outputs the reference carrier to the control carrier generation unit 112. The control carrier generation unit 112 converts the frequency of the reference carrier to a frequency that is 4/2 times thereof to generate a control carrier having a voltage command value control period including four unit periods. The control carrier generation unit 112 outputs the control carrier to the voltage command unit 9 and the PWM drive signal output unit 10.

The voltage command unit 9 computes, for every voltage command value control period, the voltage command values using: the current values Id and Iq obtained by conversion of the DC current value Idc detected by the DC current detection unit 5, performed by the current value computing unit 8; and the DC voltage value Vdc detected by the DC voltage detection unit 6. In the first computation operation, the voltage command unit 9 computes the voltage command values using, for example, the current values Id and Iq and the DC voltage value Vdc, acquired at the beginning of the voltage command value control period. The voltage command unit 9 reflects the voltage command values obtained through the computation to set new voltage command values from in two unit periods before the next voltage command value control period begins. That is, the voltage command unit 9 changes the voltage command values to resultant voltage command values obtained through the computation from in two unit periods before the start of the next voltage command value control period. In the second and later computation operations, the voltage command unit 9 computes the voltage command values using the current values Id and Iq and the DC voltage value Vdc acquired during a time period from two unit periods before the start of the voltage command value control period until one unit period before the start of the voltage command value control period, and then computes the voltage command values using the current values Id and Iq and the DC voltage value Vdc acquired during a time period from one unit period before the start of the voltage command value control period until the start of the voltage command value control period.

The timing at which the voltage command unit 9 acquires the current values Id and Iq corresponds to a timing when a voltage command value is the same as the control carrier either during a time period from two unit periods before the start of the voltage command value control period until one unit period before the start of the voltage command value control period, or during a time period from one unit period before the start of the voltage command value control period until the start of the voltage command value control period. The voltage command unit 9 computes the voltage command values for three phases using the current values Id and Iq at the timing when the voltage command value of one of U-phase, V-phase, and W-phase has the same value as the control carrier. The voltage command unit 9 reflects the voltage command values obtained through the computation to set new voltage command values from in two unit periods before the start of the next voltage command value control period. The voltage command unit 9 thereafter repeats the process of computing the voltage command values and the process of reflecting the voltage command values. The voltage command unit 9 performs similar processes even in the case where the voltage command value control period corresponds to an even number times of the unit period, for example, in the case where the voltage command value control period of (e) of FIG. 3 is equivalent to six unit periods.

That is, in the case where the voltage command value control period corresponds to an even number times of the unit period, the inverter control unit 7 performs the processes of: reflecting the voltage command values obtained through the computation to set new voltage command values from in two unit periods before the start of the next voltage command value control period; and computing the next voltage command values using the DC current value detected during a time period from two unit periods before the start of the next voltage command value control period until one unit period before the start of the next voltage command value control period. In addition, in the case where the voltage command value control period corresponds to an even number times of the unit period, the inverter control unit 7 performs the processes of: reflecting the voltage command values obtained through the computation to set new voltage command values from in two unit periods before the start of the next voltage command value control period; and computing the next voltage command values using the DC current value detected during a time period from one unit period before the start of the next voltage command value control period until the start of the next voltage command value control period. The inverter control unit 7 alternately performs the foregoing two processes for every voltage command value control period.

Similarly to the case where the number of unit periods constituting the voltage command value control period is three or more and an odd number, the inverter control unit 7 switches, for every voltage command value control period, the timing to acquire the DC current value Idc to be used in the computation of the voltage command values between a unit period in which the triangular wave carrier signal that is the control carrier monotonically increases and a unit period in which the triangular wave carrier signal that is the control carrier monotonically decreases, alternately. This causes the inverter control unit 7 to alternately encounter the detected DC current values Idc having high and low values alternately relative to the actual DC current value, thereby making it possible to reduce the error in the average value of the DC current value Idc relative to the actual DC current value.

As described above, the inverter control unit 7 provides control to alternately use, as the DC current value Idc for use in computation of the voltage command value, the DC current value Idc detected in a unit period in which the control carrier that is a triangular wave carrier signal monotonically increases, and the DC current value Idc detected in a unit period in which the control carrier that is a triangular wave carrier signal monotonically decreases, for every voltage command value control period.

Figure 4:
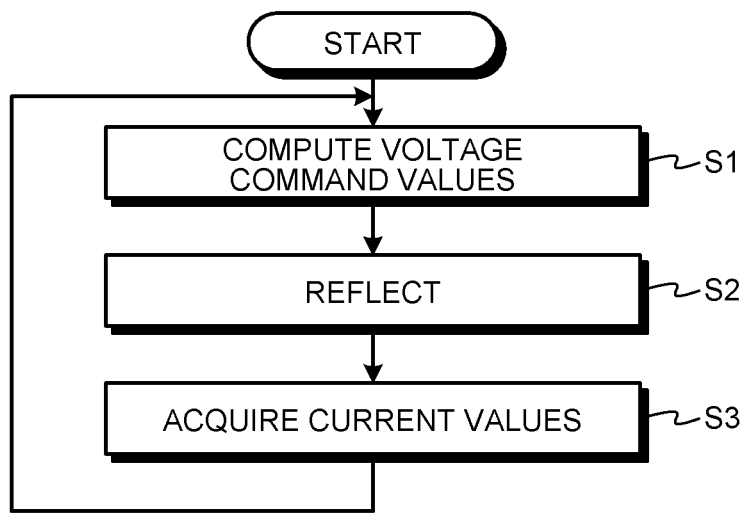
FIG. 4 is a flowchart illustrating an operation of computing a voltage command value in the voltage command unit of the inverter control unit in the inverter control device according to the first embodiment.

FIG. 4 is a flowchart illustrating an operation of computing the voltage command values in the voltage command unit 9 of the inverter control unit 7 in the inverter control device 20 according to the first embodiment. The voltage command unit 9 computes the voltage command values using the current values Id and Iq obtained by conversion from the DC current value Idc performed in the current value computing unit 8 and the DC voltage value Vdc detected by the DC voltage detection unit 6 (step S1).

The voltage command unit 9 reflects the voltage command values obtained through the computation in the next voltage command value control period (step S2). Specifically, in the case where the voltage command value control period corresponds to an odd number times of the unit period, the voltage command unit 9 reflects the voltage command values obtained through the computation to set new voltage command values from in one unit period before the start of the next voltage command value control period. In the case where the voltage command value control period corresponds to an even number times of the unit period, the voltage command unit 9 reflects the voltage command values obtained through the computation to set new voltage command values from in two unit periods before the start of the next voltage command value control period.

The voltage command unit 9 acquires the current values Id and Iq obtained by conversion performed by the current value computing unit 8 during a time period defined for the voltage command value control period (step S3). Specifically, in the case in which the voltage command value control period corresponds to an odd number times of the unit period, the voltage command unit 9 acquires the current values Id and Iq at the timing when a voltage command value is equal to the voltage value of the control carrier during a time period from one unit period before the start of the voltage command value control period until the start of the voltage command value control period. In the case in which the voltage command value control period corresponds to an even number times of the unit period, the voltage command unit 9 alternately performs, for every voltage command value control period, the process of acquiring the current values Id and Iq at the timing when the voltage command value is equal to the value of the control carrier during a time period from two unit periods before the start of the voltage command value control period until one unit period before the start of the voltage command value control period, and the process of acquiring the current values Id and Iq at the timing when the voltage command value is equal to the value of the control carrier during a time period from one unit period before the start of the voltage command value control period until the start of the voltage command value control period. The voltage command unit 9 thereafter repeats the operations from step S1 to step S3.

A hardware configuration of the inverter control device 20 will next be described. In the inverter control device 20, the inverter control unit 7 is implemented based on a processing circuit. The processing circuit may be a combination of a processor that executes a program stored in a memory and the memory, or may be a dedicated hardware set.

Figure 5:
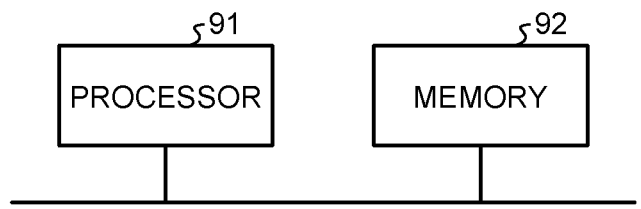
FIG. 5 is a diagram illustrating an example of a case in which a processing circuit included in the inverter control device according to the first embodiment is configured by a processor and a memory.

FIG. 5 is a diagram illustrating an example of a case in which the processing circuit included in the inverter control device 20 according to the first embodiment is configured by a processor and a memory. In a case in which the processing circuit is configured by a processor 91 and a memory 92, each functionality of the processing circuit is implemented in software, firmware, or a combination of software and firmware. The software or firmware is described as a program, and stored in the memory 92. In the processing circuit, each functionality is provided by the processor 91 reading and executing a program stored in the memory 92. It can also be said that these programs cause a computer to perform the procedure and the method of the inverter control unit 7.

In this regard, the processor 91 may be a central processing unit (CPU), a processing device, a computing device, a microprocessor, a microcomputer, a digital signal processor (DSP), or the like. In addition, for the memory 92, use is made of, for example, a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk; a flexible disk; an optical disk; a compact disc; a MiniDisc, a digital versatile disc (DVD); or the like.

Figure 6:
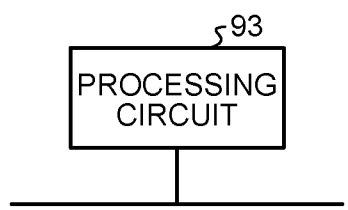
FIG. 6 is a diagram illustrating an example of a case in which a processing circuit included in the inverter control device according to the first embodiment is configured by dedicated hardware.

FIG. 6 is a diagram illustrating an example of a case in which the processing circuit included in the inverter control device 20 according to the first embodiment is configured by dedicated hardware. In the case in which the processing circuit is configured by a dedicated hardware set, the processing circuit 93 illustrated in FIG. 6 is realized using, for example, a single circuit, a composite circuit, a programmed processor, a parallel-programmed processor, an application specific integrated circuit (ASIC), a field programmable gate array (FPGA), or a combination thereof. Each functionality of the inverter control unit 7 may be implemented in the processing circuit 93 on a function-by-function basis, or all the functionalities may be implemented in the processing circuit 93 collectively as a whole.

Note that some of functionalities of the inverter control unit 7 may be implemented by dedicated hardware, and the remainder thereof may be implemented by software or firmware. In this way, the processing circuit can realize the foregoing functionalities based on dedicated hardware, software, firmware, or any combination of them. The inverter control unit 7 of the inverter control device 20 described in embodiments described below has a similar hardware configuration.

As described above, the present embodiment enables the inverter control unit 7 to reduce the error in the average value of the DC current value Idc that has been detected relative to the actual DC current value even when the voltage command value control period is equivalent to four or more, and an even number of the unit periods, by alternately providing a monotonically increasing period and a monotonically decreasing period for every voltage command value control period, with a unit period for detecting the DC current value Idc being used, thereby making it possible to reduce or eliminate an influence of the DC current value Idc on the inverter control accuracy. Thus, the inverter control unit 7 can relax the constraint on the voltage command value control period in such a manner that the constraint is made to allow not only three or more and an odd number of the unit periods but also four or more and an even number of the unit periods. By so doing, the inverter control unit 7 can reduce or prevent a reduction in a combined total efficiency of the efficiency of the inverter main circuit 3 and the efficiency of the motor 4, and can select a suitable triangular wave carrier signal to control the operation of the inverter main circuit 3. In addition, the inverter control unit 7 is allowed to extend the time period for reflection in the voltage command value control period, and thus has advantageous effect of providing dispersion in controllability.

Second Embodiment

In the first embodiment, the computing unit 81 of the inverter control unit 7 computes the current values Iu, Iv, and Iw for three phases by obtaining phase current information for at least two phases from the DC current value Idc. However, there is a case where phase current information for two phases cannot be obtained from the DC current value Idc depending on the timing at which the DC current detection unit 5 detects the DC current value Idc. In a second embodiment, the inverter control unit 7 is configured such that the voltage command unit 9 corrects the voltage command values, and the PWM drive signal output unit 10 corrects and outputs the PWM drive signals based on the corrected voltage command values, thereby to successfully obtain phase current information for at least two phases from the DC current value Idc.

Figure 7:
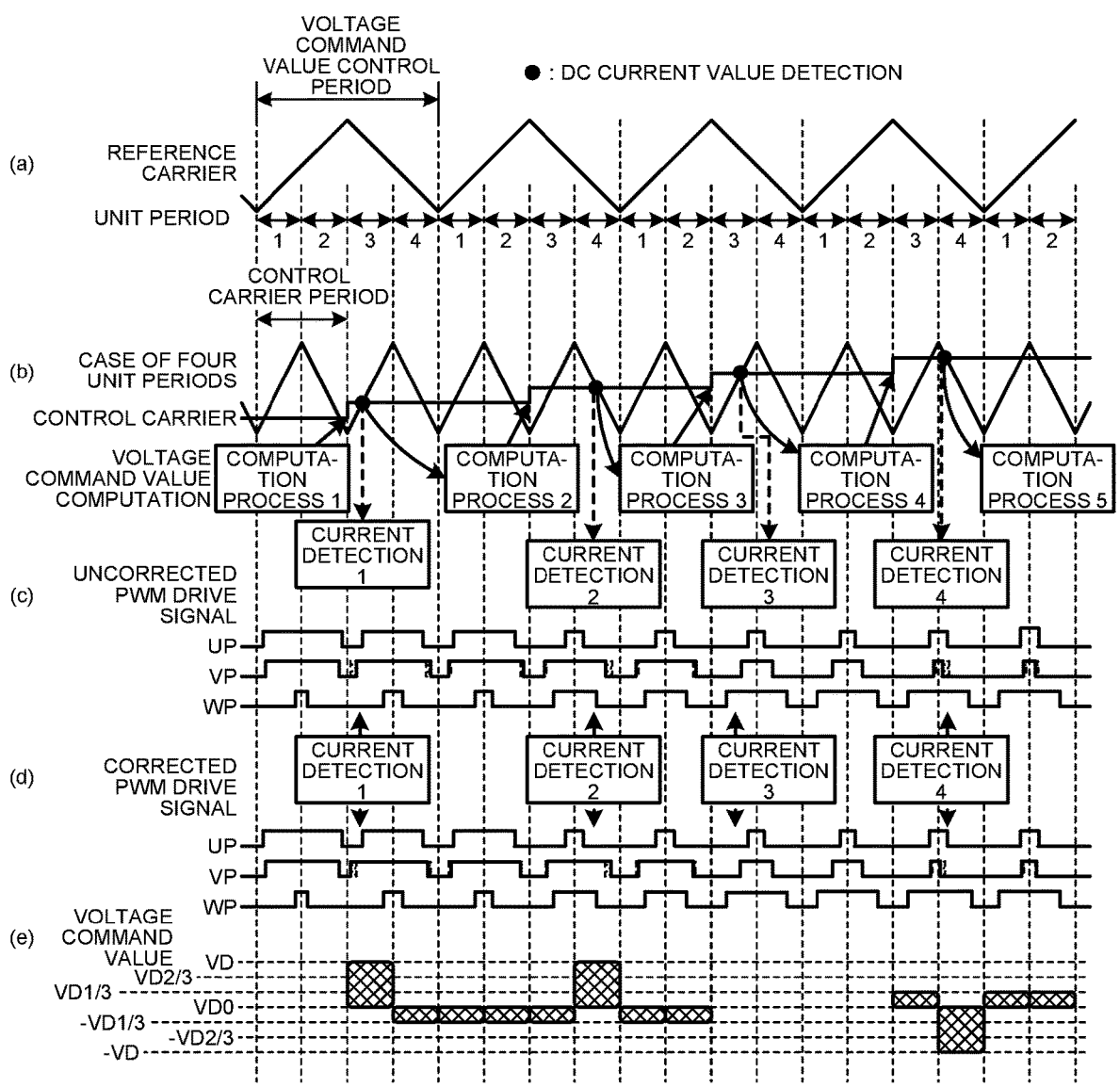
FIG. 7 is a chart illustrating correction processing in an inverter control unit of the inverter control device according to a second embodiment.

In the second embodiment, the inverter control device 20 and the inverter control unit 7 are configured similarly to those in the first embodiment. FIG. 7 is a chart illustrating correction processing in the inverter control unit 7 of the inverter control device 20 according to the second embodiment. In FIG. 7, (a) thereof is similar to (a) of FIG. 3 mentioned above. The second embodiment assumes, by way of example, that the voltage command value control period includes four unit periods. (b) of FIG. 7 is similar to (c) of FIG. 3 mentioned above. (c) of FIG. 7 illustrates uncorrected PWM drive signals generated by the PWM drive signal output unit 10 in a case in which the voltage command values computed by the voltage command unit 9 of the inverter control unit 7 are used as it is. (d) of FIG. 7 illustrates corrected PWM drive signals generated by the PWM drive signal output unit 10 in a case in which the voltage command values that have been corrected by the voltage command unit 9 of the inverter control unit 7 are used. (e) of FIG. 7 illustrates the amount of correction made on a voltage command value computed, in the voltage command unit 9. FIG. 7 illustrates, by way of example, an example in which the voltage command unit 9 corrects the voltage command value Vv, and the PWM drive signal output unit 10 corrects the PWM drive signal VP.

The voltage command unit 9 corrects a voltage command value to make the value larger or smaller than the value obtained through the computation, so as to enable the current value computing unit 8 to obtain phase current information for two phases from the DC current value Idc in a unit period in which the current values Id and Iq are acquired. The correction performed by the voltage command unit 9 during the unit period in which the current values Id and Iq are acquired is herein referred to as first correction. In addition, in a unit period in which the current values Id and Iq are not acquired, the voltage command unit 9 corrects the voltage command values obtained through the computation, to remove the influence of the first correction on the control of the inverter main circuit 3. The correction performed by the voltage command unit 9 during a unit period in which the current values Id and Iq are not acquired is herein referred to as second correction. The second correction is correction to reduce the error in the control of the inverter main circuit 3 caused by the first correction to zero or almost zero. The PWM drive signal output unit 10 corrects the PWM drive signals in accordance with the amounts of correction on the voltage command values.

Specifically, a case will be described in which the DC current detection unit 5 detects the DC current value Idc at the timings of current detections 1 and 2 illustrated in FIG. 7. In the case of use of the uncorrected PWM drive signals illustrated in (c) of FIG. 7, the DC current detection unit 5 can obtain phase current information for two phases including negative current information for the U-phase and positive current information for the V-phase from the DC current value Idc in a section in which the PWM drive signal VP is active and the PWM drive signals UP and WP are non-active. However, when a section in which the PWM drive signal VP is active and the PWM drive signals UP and WP are non-active is not sufficiently ensured, the DC current detection unit 5 cannot accurately detect the actual DC current value, and therefore cannot obtain positive current information for the V-phase from the DC current value Idc, that is, cannot obtain the phase current information for two phases.

For this reason, the voltage command unit 9 extends, by a length for a specified value VD, a period in which the voltage command value Vv of the V-phase having a small difference in output time is active with reference to the U-phase that is the middle value of output times of the PWM drive signals of U-phase, V-phase, and W-phase, thereby to correct the PWM drive signals generated by the PWM drive signal output unit 10. Specifically, the voltage command unit 9 extends a period in which the voltage command value Vv is active by a length for the value VD as illustrated in (e) of FIG. 7 at the timings of current detections 1 and 2 illustrated in FIG. 7. By the use of the voltage command value Vv corrected by the voltage command unit 9, the PWM drive signal output unit 10 can generate the corrected PWM drive signal VP of (d) of FIG. 7, which has been corrected from non-active to active in the hatched portion with respect to the uncorrected PWM drive signal VP of (c) of FIG. 7. This enables the DC current detection unit 5 to sufficiently ensure the section in which the PWM drive signal VP is active and the PWM drive signals UP and WP are non-active, and thus to obtain the positive current information on the V-phase.

Due to a sufficient duration of the section in which the PWM drive signals UP and VP are active and the PWM drive signal WP is non-active, the DC current detection unit 5 can obtain negative current information for the W-phase from the DC current value Idc in this section. Thus, the DC current detection unit 5 can obtain the phase current information for two phases including the positive current information for the V-phase and the negative current information for the W-phase.

Note that the voltage command unit 9 extends a period in which the voltage command value Vv of the V-phase is active by a length for the value VD by a unit period in which the DC current detection unit 5 detects the DC current value Idc. Therefore, the voltage command unit 9 corrects the voltage command value Vv of the V-phase to provide a reduction by one third of VD for each unit period over three unit periods until the unit period in which the DC current detection unit 5 next detects the DC current value Idc. This enables the voltage command unit 9 to remove the influence of the correction of the voltage command value Vv on the control of the inverter main circuit 3 for every voltage command value control period.

At the timing of current detection 3 illustrated in FIG. 7, the DC current detection unit 5 can obtain phase current information for two phases even when the voltage command unit 9 does not correct the voltage command value Vv. In this case, the voltage command unit 9 does not correct the voltage command value Vv.

As in the case in which the DC current detection unit 5 detects the DC current value Idc at the timing of current detection 4 illustrated in FIG. 7, the voltage command unit 9 may reduce the voltage command value by the specified value VD in the unit period in which the DC current detection unit 5 detects the DC current value Idc. In this case, the voltage command unit 9 reduces, by the specified value VD, the voltage command value Vv of the V-phase having a small difference in the output value time with reference to the U-phase that is the middle value of output value times of the PWM drive signals of U-phase, V-phase, and W-phase, thereby to correct the PWM drive signals generated by the PWM drive signal output unit 10. By the use of the voltage command value Vv corrected by the voltage command unit 9, the PWM drive signal output unit 10 can generate the corrected PWM drive signal VP of (d) of FIG. 7, which has been corrected from active to non-active in the hatched portion with respect to the uncorrected PWM drive signal VP of (c) of FIG. 7. This enables the DC current detection unit 5 to sufficiently ensure the section in which the PWM drive signal VP is non-active and the PWM drive signals UP and WP are active, and thus to obtain the phase current information for two phases. In addition, the voltage command unit 9 corrects the voltage command value Vv of the V-phase to provide an increase by one third of VD for each unit period over three unit periods. This enables removal of the influence of the correction of the voltage command value Vv on the control of the inverter main circuit 3 for every voltage command value control period.

As described above, the inverter control unit 7 makes a first correction to correct voltage command values to make the values larger or smaller than the voltage command values obtained through the computation, so as to obtain phase current information for at least two phases from the DC current value in a unit period in which the DC current value Idc is detected by the DC current detection unit 5. In addition, in a unit period in which the DC current value Idc is not detected by the DC current detection unit 5, the inverter control unit 7 makes a second correction to correct voltage command values obtained through the computation to remove the influence of the first correction on the control of the inverter main circuit 3.

As described above, according to the present embodiment, the inverter control unit 7 is configured such that the voltage command unit 9 corrects the voltage command values, and the PWM drive signal output unit 10 corrects and outputs the PWM drive signals based on the corrected voltage command values, so as to enable phase current information for at least two phases to be obtained from the DC current value Idc in the DC current detection unit 5. By doing so, the DC current detection unit 5 can detect the DC current value Idc with high accuracy, and obtain the phase current information for two phases.

Third Embodiment

In the first and second embodiments, the DC current value Idc detected by the DC current detection unit 5 may include a ripple amplitude caused by fluctuation of the actual DC current. A third embodiment directed to a method of reducing or eliminating the ripple amplitude will now be described.

Figure 8:
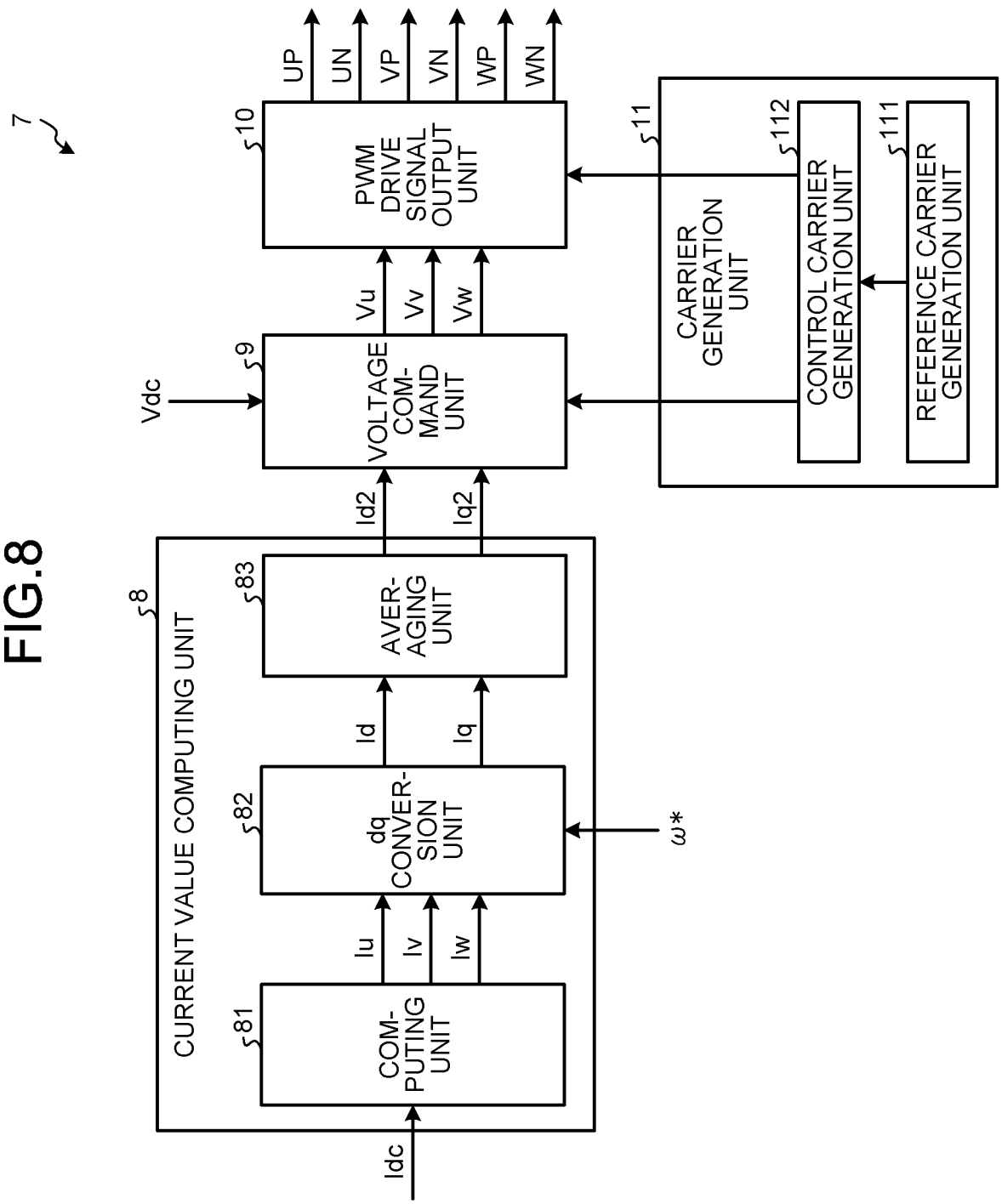
FIG. 8 is a block diagram illustrating an example configuration of the inverter control unit of the inverter control device according to a third embodiment.

In the third embodiment, the inverter control device 20 is configured similarly to that in the first embodiment. FIG. 8 is a block diagram illustrating an example configuration of the inverter control unit 7 of the inverter control device 20 according to the third embodiment. The inverter control unit 7 of the third embodiment additionally includes an averaging unit 83 as compared to the inverter control unit 7 of the first embodiment illustrated in FIG. 2. The averaging unit 83 averages the current values Id and Iq on orthogonal coordinate axes obtained in the last voltage command value control period and the current values Id and Iq on orthogonal coordinate axes obtained in the present voltage command value control period to obtain averaged current values Id2 and Iq2 on orthogonal coordinate axes. The voltage command unit 9 obtains, through computation, the voltage command values using the averaged current values Id2 and Iq2 on orthogonal coordinate axes. The voltage command unit 9 computes the voltage command values similarly to the first and second embodiments.

As described above, in a case in which the DC current value Idc has been converted into the current values Id and Iq on orthogonal coordinate axes, the inverter control unit 7 computes the voltage command values for the present voltage command value control period using the average values of the current values Id and Iq on orthogonal coordinate axes obtained in the last voltage command value control period and the current values Id and Iq on orthogonal coordinate axes obtained in the present voltage command value control period.

As described above, according to the present embodiment, the inverter control unit 7 is configured to use, as the current values on orthogonal coordinate axes for use in computation of the voltage command values, the averages of the current values Id and Iq on orthogonal coordinate axes obtained in the last voltage command value control period and the respectively corresponding current values Id and Iq on orthogonal coordinate axes obtained in the present voltage command value control period. This enables the inverter control unit 7 to reduce or eliminate the ripple amplitude that is an attribute of fluctuation in detecting the DC current, and thus to reduce or eliminate the influence on the accuracy of control of the inverter main circuit 3 in the case of use of current values on orthogonal coordinate axes.

The configurations described in the foregoing embodiments are merely examples of contents of the present invention, and can each be combined with other publicly known techniques and partially omitted and/or modified without departing from the scope of the present invention.

The invention claimed is:

1. An inverter control device comprising:
an inverter main circuit converting a direct-current voltage into three-phase alternating-current voltages;
a direct current detection unit detecting a direct current value of an electric direct current flowing in the inverter main circuit; and
a control unit generating a drive signal for controlling an operation of the inverter main circuit using a voltage command value corresponding to each phase of the three-phase alternating-current voltages and a triangular wave carrier signal, wherein
using a time period during which the triangular wave carrier signal monotonically increases or monotonically decreases as a unit period, the control unit provides control to alternately use, as the direct current value to be used in computation of the voltage command value, the direct current value detected in a unit period in which the triangular wave carrier signal monotonically increases and the direct current value detected in a unit period in which the triangular wave carrier signal monotonically decreases, for every voltage command value control period that is a period for computing the voltage command value, the voltage command value control period being set to three times or more of and an integer multiple of the unit period,
in a case in which the voltage command value control period corresponds to an odd number times of the unit period, the control unit repeats a process of: reflecting a voltage command value obtained through computation to set a new voltage command value from in one unit period before a start of a next voltage command value control period; and computing a next voltage command value using a direct current value detected in one unit period from one unit period before the start of the next voltage command value control period, and
in a case in which the voltage command value control period is an even number times of the unit period, the control unit alternately performs, for every voltage command value control period, a process of: reflecting a voltage command value obtained through computation to set a new voltage command value from in two unit periods before the start of the next voltage command value control period; and computing a next voltage command value using a direct current value detected in one unit period from two unit periods before the start of the next voltage command value control period, and another process of: reflecting the voltage command value obtained through computation to set a new voltage command value from in two unit periods before the start of the next voltage command value control period; and computing a next voltage command value using a direct current value detected in one unit period from one unit period before the start of the next voltage command value control period.

2. The inverter control device according to claim 1, wherein
the control unit performs first correction of correcting a voltage command value to make the value larger or smaller than the voltage command value obtained through computation to obtain phase current information for at least two phases from the direct current value in a unit period in which the direct current value is detected, and performs second correction on the voltage command value obtained through computation to remove an influence of the first correction on control of the inverter main circuit in a unit period in which the direct current value is not detected.

3. The inverter control device according to claim 1, wherein
in a case in which the direct current value has been converted into a current value on an orthogonal coordinate axis, the control unit computes a voltage command value for a present voltage command value control period using an average value of a current value on an orthogonal coordinate axis obtained in a last voltage command value control period and a current value in an orthogonal coordinate axis obtained in the present voltage command value control period.

4. The inverter control device according to claim 1, wherein
the control unit includes a carrier generation unit generating the triangular wave carrier signal from a reference carrier whose one period is equal to the voltage command value control period.

5. The inverter control device according to claim 2, wherein
in a case in which the direct current value has been converted into a current value on an orthogonal coordinate axis, the control unit computes a voltage command value for a present voltage command value control period using an average value of a current value on an orthogonal coordinate axis obtained in a last voltage command value control period and a current value in an orthogonal coordinate axis obtained in the present voltage command value control period.

6. The inverter control device according to claim 2, wherein
the control unit includes a carrier generation unit generating the triangular wave carrier signal from a reference carrier whose one period is equal to the voltage command value control period.

7. The inverter control device according to claim 3, wherein
the control unit includes a carrier generation unit generating the triangular wave carrier signal from a reference carrier whose one period is equal to the voltage command value control period.

8. The inverter control device according to claim 5, wherein
the control unit includes a carrier generation unit generating the triangular wave carrier signal from a reference carrier whose one period is equal to the voltage command value control period.

\* \* \* \* \*